United States Patent [19]

Fujiwara

[11] Patent Number: 4,807,721
[45] Date of Patent: Feb. 28, 1989

[54] AIR LINE LUBRICATOR

[75] Inventor: Masaki Fujiwara, Sohka, Japan

[73] Assignee: Shoketsu Kinzoku Kabushiki Kaisha, Tokyo, Japan

[21] Appl. No.: 183,359

[22] Filed: Apr. 12, 1988

Related U.S. Application Data

[63] Continuation of Ser. No. 842,238, Mar. 21, 1986, abandoned.

[51] Int. Cl.$^4$ .............................................. F16N 7/34
[52] U.S. Cl. ..................... 184/55.2; 138/39; 138/45; 138/46
[58] Field of Search ............ 184/55.1, 55.2, 57, 184/58, 59, 39.1; 137/599.1, 855; 261/784, DIG. 65, 78 A; 138/37, 39, 44, 45, 46; 366/336, 337, 351; 239/533.13

[56] References Cited

U.S. PATENT DOCUMENTS

| | | | |
|---|---|---|---|
| 1,513,645 | 10/1924 | Smith | 138/45 |
| 2,460,647 | 2/1949 | Miller | 138/45 |
| 3,411,609 | 11/1968 | German | 184/55.2 |
| 3,605,949 | 9/1971 | Vock | 184/55.2 |
| 3,628,565 | 12/1971 | McWethy | 137/855 |
| 3,680,661 | 8/1972 | Dolegowski | 184/55.2 |
| 3,696,889 | 10/1972 | Brake | 184/55.2 |
| 3,703,940 | 11/1972 | Morita | 184/55.2 |
| 3,739,983 | 6/1973 | Jousson | 138/45 |
| 4,043,425 | 8/1977 | Schutzer | 184/55.2 |
| 4,295,545 | 10/1981 | Hiei | 184/55.2 |
| 4,344,459 | 8/1982 | Nelson | 138/45 |

FOREIGN PATENT DOCUMENTS

| | | | |
|---|---|---|---|
| 69408 | 11/1958 | France . | |
| 2107086 | 5/1972 | France . | |
| 9769 | 1/1977 | Japan | 184/55.2 |
| 2109092 | 5/1983 | United Kingdom . | |

Primary Examiner—Leonard E. Smith
Attorney, Agent, or Firm—Burns, Doane Swecker & Mathis

[57] ABSTRACT

A lubricator for mixing lubricating oil in air under pressure has a damper serving as a variable restriction mechanism and a support by which the damper is supported, the damper and the support being integrally molded of a flexible material. The damper has a groove defined in the lower end thereof joined to the support. Since the damper and the support are of a unitary structure, their dimensional accuracy is increased and the height of the damper is not subject to variations. Because the damper is made highly flexible by the grooves for easy flexing displacement, the unwanted oscillation of the damper at the maximum air flow rate is avoided, and the damper can supply the lubricating oil at a rate substantially proportional to the air flow rate over the entire range from the minimum air flow rate to the maximum air flow rate. The damper is also improved in durability.

3 Claims, 4 Drawing Sheets

AIR LINE LUBRICATOR

This application is a continuation of application Ser. No. 06/842,238, filed Mar. 21, 1986, now abandoned.

BACKGROUND OF THE INVENTION

The present invention relates to a lubricator, and more particularly to a lubricator including a damper serving as a variable restriction mechanism and molded, integrally with a support thereof, of a flexible material, the damper having a groove defined in its base portion for increased flexibility to control the amount of oil mixed in an air flow and increase its durability.

It is well known that a lubricator is generally employed to mix a small amount of oil in compressed air for supplying lubricating oil to a sliding surface in a pneumatically operated device. In the lubricator, the differential pressure produced, by the variable restriction mechanism is utilized to force the lubricating oil upwardly from a case through a siphon tube. The lubricating oil delivered from the case is then drawn through a small hole as atomized droplets into a passage for the compressed air.

One conventional variable restriction mechanism used in the lubricator is illustrated in FIG. 1 of the accompanying drawings. The variable restriction mechanism comprises a resilient tongue-shaped damper 6 disposed in an air passage 4 defined in a lubricator body 2. The damper 6 is sandwiched vertically between bent supports 8a, 8b and fastened thereto by a screw 10. The support 8a has a passage 11 communicating with the air passage 4 and also with a passage 13 defined in a damper holder 12 threaded in the lubricator body 2.

The damper 6 is caused to flex according to the amount of air flowing through the air passage 4 for thereby varying the cross-sectional area of the air passage 4. Part of the air flowing in the air passage 4 is directed through the passages 11, 13 in the direction of the broken-line arrows to impose a force on the oil stored in the lubricator body 2. Therefore, there is produced a differential pressure downstream of the damper 6 which is proportional to the speed of air flow throughout the entire range from a minimum air flow rate to a maximum air flow rate, so that a suitably metered amount of lubricating oil is supplied downstream of the damper 6.

With the prior variable restriction mechanism, the damper 6 is fastened to the supports 8a, 8b by the screw 10. Therefore, where the threaded holes in the supports 8a, 8b or the screw hole in the damper 6 is subjected to a positional error, the height of the damper 6 is varied. As a result, the gap between the wall surface of the air passage 4 and the damper 6 may be increased, with the consequence that the minimum rate of flow of the supplied lubricating oil cannot be lowered. The damper 6 is limited in its flexible length by the supports 8a, 8b. Even when it is flexibly displaced to a maximum extent, it is turned over only to a position in the vicinity of the center of the air passage 4. The damper 6 is therefore liable to oscillate due to a pulsating air flow when the air flows at the maximum rate, resulting in fatigue-induced damage or breakage.

SUMMARY OF THE INVENTION

It is a general object of the present invention to provide a lubricator capable of controlling the amount of oil to be mixed in an air flow and having a damper of an increased degree of durability.

Another object of the present invention is to provide a lubricator comprising a case for storing lubricating oil, a body coupled to the case and defining an air passage therethrough, and a damper disposed in the air passage and flexibly displaceable dependent on the rate of air flow through the air passage for varying the effective cross-sectional area of the air passage, the damper comprising a plate-like damper body positioned in the air passage and a support mounted in the body and supporting the damper body, the damper body and the support being integrally molded of a flexible material, the damper body having a groove defined in the vicinity of a base portion thereof close to the support.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENT

Figure 1:
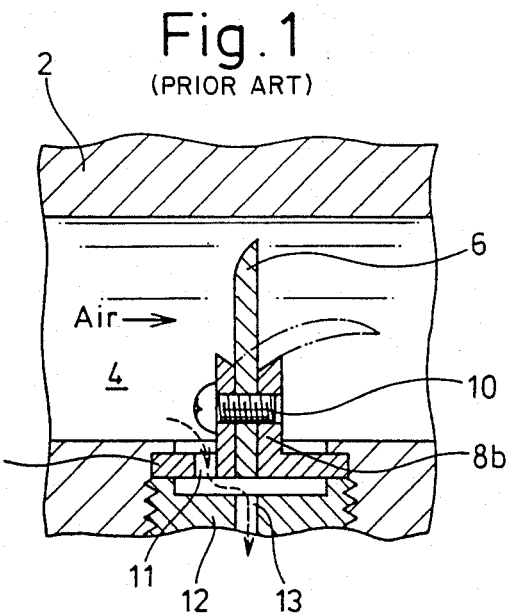
FIG. 1 is a cross-sectional view of a conventional damper.
Figure 2:
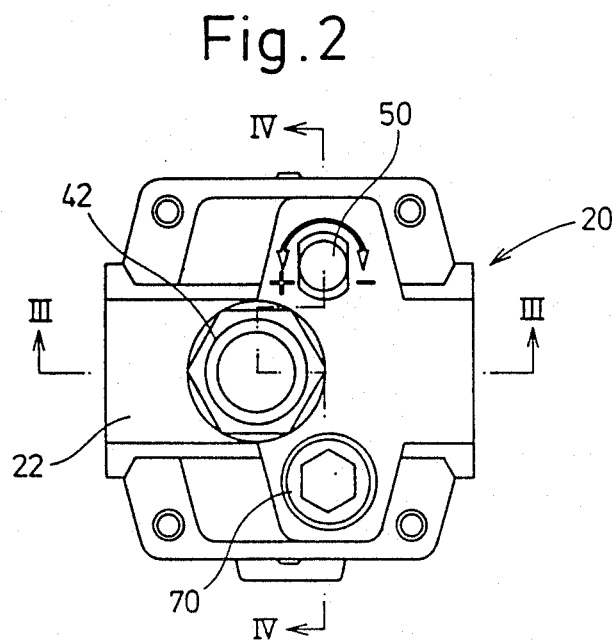
FIG. 2 is a plan view of a lubricator according to the present invention.

As shown in FIGS. 2 through 5, a lubricator according to the present invention, generally denoted by the reference numeral 20, includes a body 22 and a case 24. The case 24 is in the form of a bottomed tubular body fitted in a circular hole 26 defined in the body 22 with a seal ring 28 interposed therebetween. The case 24 is retained on the body 22 against detachment by a tubular case guard 30 fixed to the body 22.

The body 22 has an air passage 32 defined therein and extending horizontally (FIG. 3) therethrough. The air passage 32 has end openings in which tapered screw threads 34a, 34b are formed for connection to tubular couplings (not shown). The body 22 also has a hole 38 defined in its upper surface in communication with the air passage 32 through a small hole 36. A tubular body 40 of a transparent material is fitted in the hole 38. Another tubular body 42 of a transparent material is threaded in the hole 38 outwardly of the tubular body 40 in spaced relation thereto. The tubular bodies 40, 42 have upper closed ends and lower open ends. The interior chamber of the tubular body 40 is therefore held in communication with the air passage 32 through the small hole 36. The upper closed end of the tubular body 40 has a projection 43 (FIG. 3) directed downwardly and having a communication hole 44 communicating with the interior chamber of the tubular body 40. The interior chamber of the tubular body 40 communicates through the communication hole 44 with a gap 45 defined between the tubular body 40 and the tubular body 42 disposed therearound.

The body 22 also has a hole 46 (FIG. 4) extending vertically therethrough. A bottomed needle stud guide 48 is fitted in the hole 46 and accommodates therein a needle stud 50 vertically movable in response to turning of a knob 51 for controlling the opening area of a valve port 48a defined in the bottom of the needle stud guide 48. The needle stud guide 48 and the needle stud 50 disposed therein jointly constitute a metering needle stud assembly. The hole 46 includes an annular space 52 communicating via a communication hole 54 with the gap 45 between the tubular bodies 40, 42 and also communicating via a communication hole 56 with the valve port 48a. The body 22 also has in its upper surface an oil supply port 72 in which an oil supply plug 70 is threaded, the oil supply port 72 communicating with the hole 26. When lubricating oil is supplied into the oil supply port 72 with the oil supply plug 70 removed, the lubricating oil flows through the hole 26 into the case 24.

Figure 3:
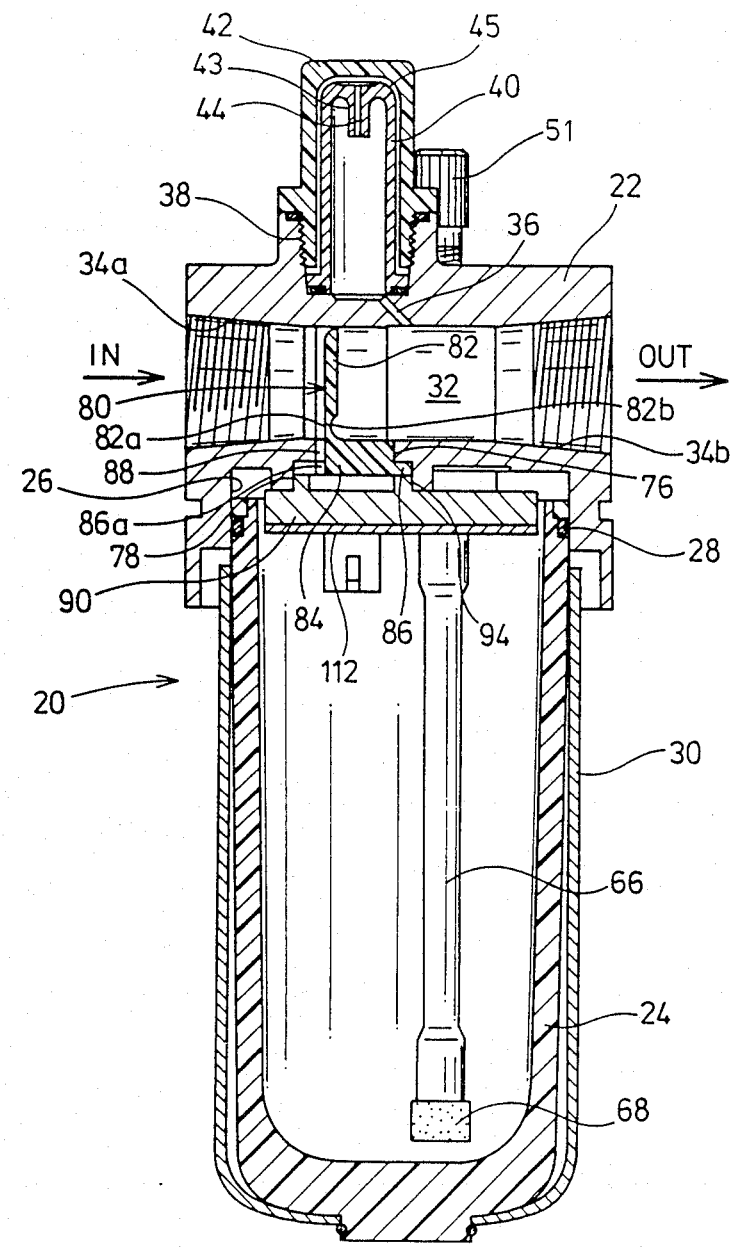
FIG. 3 is a cross-sectional view taken along line III—III of FIG. 2.

As shown in FIG. 3, the body 22 has a rectangular recess 78 defined in its lower surface and communicating with the air passage 32 through a rectangular hole 76. A damper 80 serving as a variable restriction mechanism is disposed in the recess 78.

The damper 80 is of a unitary structure molded of synthetic resin including a thin plate-like damper body 82 extending from the hole 76 into the air passage 32, a support 84 on which the damper 82 is supported, and a flange 86 projecting from the outer periphery of the support 84. The damper body 82 has a shell shape in complimentary relation to the cross-sectional shape of the air passage 32 and includes a groove 82b of a semicircular cross section defined in a surface of the base portion 82a thereof which faces downstream in the direction in which air flows through the air passage 32. The groove 82b makes the base portion 82a thinner than the remaining portion of the damper 80. The support 84 is of a rectangular shape insertable in the hole 76. The support 84 is so dimensioned in the horizontal direction in FIG. 3 that when the support 84 is inserted in the hole 76, there is a small gap 88 defined between the support 84 and a wall surface of the hole 76 upstream of the damper body 82. The flange 86 is of a rectangular configuration complementary to the shape of the recess 78 and has a communication hole 86a communicating with the gap 88.

Figure 4:
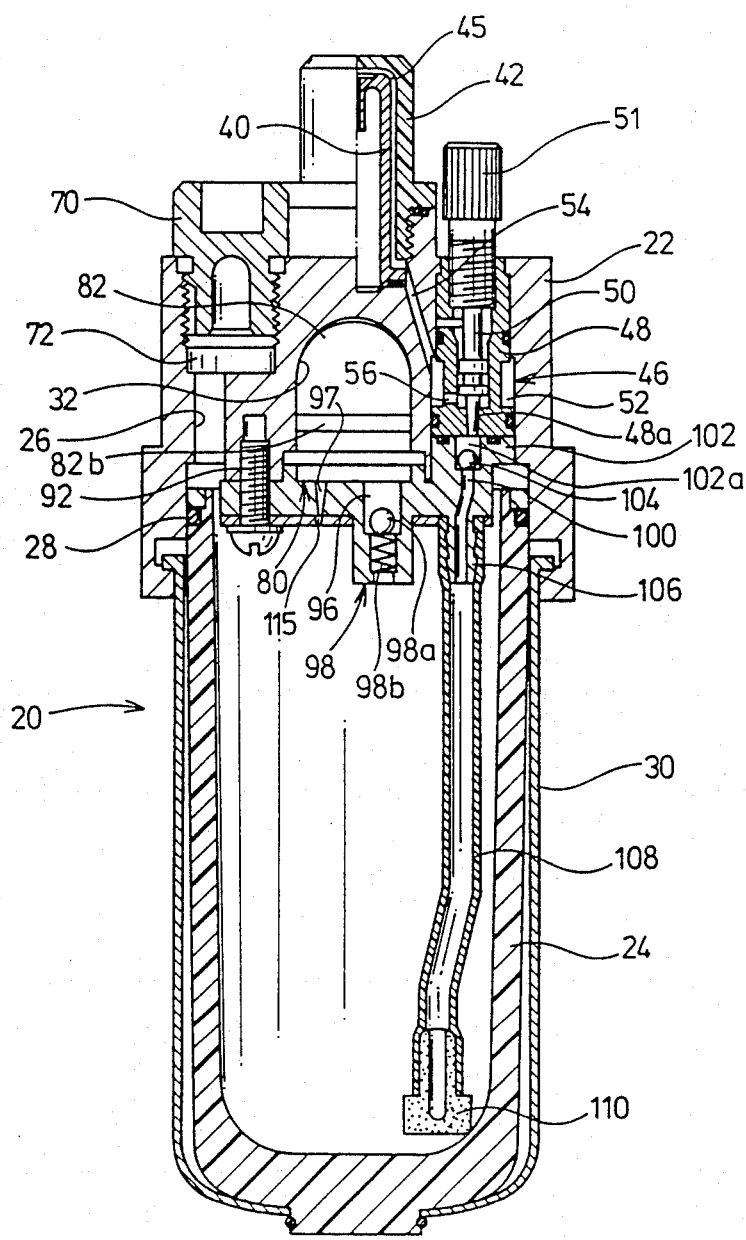
FIG. 4 is a cross-sectional view taken along line IV—IV of FIG. 2.
Figure 5:
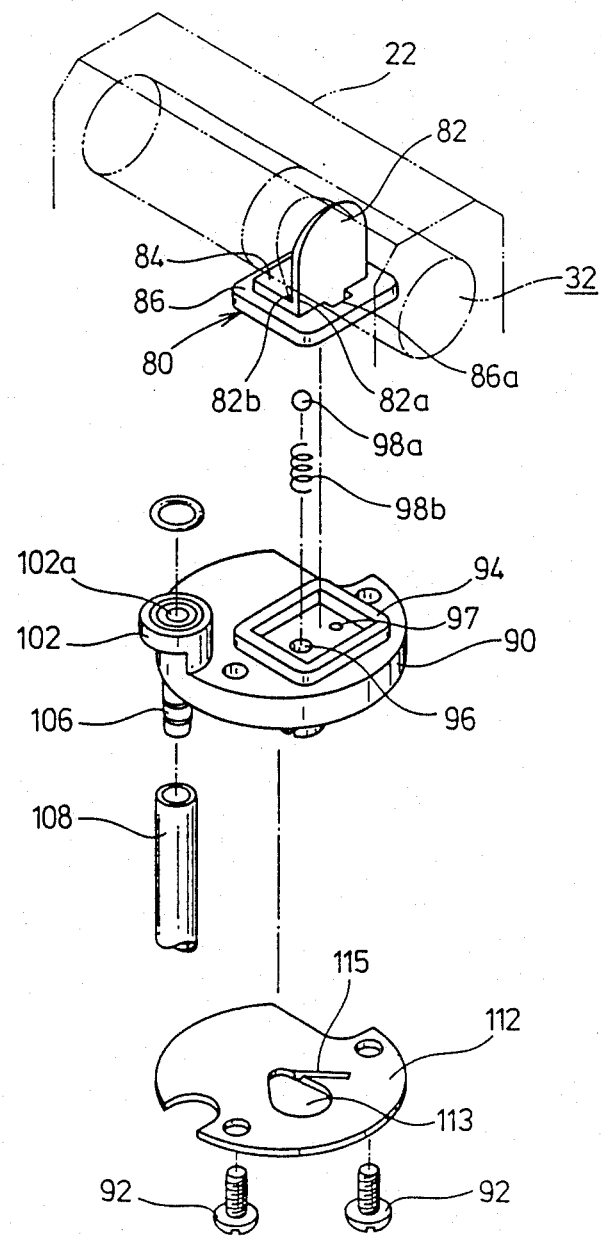
FIG. 5 is an exploded perspective view of a portion of the lubricator of the present invention.

The damper 80 is securely supported in position by a relatively thick plate-like damper holder 90 coupled to the body 22 by screws 92 (FIGS. 4 and 5). The damper holder 90 is a unitary body molded of synthetic resin and has on its upper surface a rectangular ridge 94 fitted in the recess 78 for pressing the flange 86 upwardly. The damper holder 90 also has a vertical through passage 96 defined therein and positioned within the ridge 94 and a conical hole 97 defined therein and positioned within the ridge 94, the conical hole 97 serving as a fixed restriction. The damper 90 includes a downwardly projecting boss through which the passage 96 opens into the case 24 and which houses a check valve 98. The check valve 98 essentially comprises a check ball 98a and a check ball spring 98b for normally urging the check ball 98a upwardly to keep the check valve 98 open.

As shown in FIG. 4, the damper holder 90 has a vertical through passage 100 defined in a side portion thereof. A tubular body 102 is integrally connected to the open end of the passage 100 which opens into the body 22. The tubular body 102 is fitted in the lower end of the hole 46 in communication with the valve port 48a. A check ball 104 is disposed in a passage 102a defined in the tubular body 102. Another tubular body 106 is integrally connected to the open end of the passage 100 which opens into the case 24. To the tubular body 106, there is coupled an oil tube 108 having a distal end opening toward the bottom of the case 24 through a filter 110. A metal cover plate 112 (FIG. 5) is fastened, together with the damper holder 90, to the body 22 by the screws 92. The cover plate 110 has a large-diameter hole 113 which opens into the case 24 as the cover plate 110 is assembled, and a wedge-shaped slot 115 communicating with the large-diameter hole 113. When the damper holder 90 and the cover plate 112 are assembled on the body 22, the large-diameter hole 113 communicates via the slot 115 with the hole 97.

Operation and advantages of the lubricator thus constructed will be described below.

When air under pressure flows from the inlet end of the air passage 32 which has the tapered screw threads 34a toward the outlet end of the air passage 32 which has the tapered screw threads 34b, the damper body 82 of the damper 80 is caused to flex downstream to an extent dependent on the rate of air flow, thereby increasing the effective cross-sectional area of the air passage 32. Since the base portion 82a of the damper body 82 is made thinner by the groove 82b, the damper body 82 can flex easily even with a small air flow under pressure acting on the damper body 82. Therefore, the damper body 82 can flex substantially in proportion to the air flow rate over the entire range from the minimum air flow rate to the maximum air flow rate. Through the restriction effect provided by the damper 80, a differential pressure dependent on the speed of air flow through the air passage 32 is generated in the hole 36 opening into the air passage 32 downstream of the damper body 82 and acts in the tubular body 40. Part of the air flowing in the air passage 32 enters the space defined above the upper surface of the damper holder 90 through the gap 88 and the communication hole 86a formed in the support 84, and then flows into the case 24 through the hole 97, the slot 115, and the large-diameter hole 113 to pressurize lubricating oil (not shown) stored in the case 24. Consequently, there is a differential pressure developed between the pressure in the case 24 and the pressure in the tubular body 40 for forcing the lubricating oil in the case 24 upwardly through the oil tube 108 and the check ball 104 into the needle stud assembly. The needle stud assembly has been adjusted by turning the knob 51 to select a suitable distance between the distal end of the needle stud 50 and the valve port 48a. Therefore, the metered amount of lubricating oil flows from the needle stud assembly through the communication hole 56, the annular space 52, the communication hole 54, the gap 45 between the tubular bodies 40, 42, and the communication hole 44 into the tubular body 40, from which the lubricating oil drops into the air passage 32. The lubricating oil as it falls into the air passage 32 is atomized into fine droplets by the air flow and delivered on the air flow to a device desired to be lubricated.

When lubricating oil is supplied through the oil supply port 72 into the case 24 while air is flowing though the air passage 32, the check valve 98 is closed to prevent the flow of air under pressure which has leaked through the hole 96.

With the arrangement of the present invention, a damper disposed as a variable restriction mechanism and a support therefor are integrally molded of a flexible material. Therefore, any dimensional variations of the damper due to manufacturing errors can be reduced. Since the damper is not limited in its flexing displacement by the support, but can flex to a large extent also because of a groove defined therein, the damper is prevented from oscillation which would otherwise occur at the maximum air flow rate, with the result that the damper is protected against fatigue-induced damage or breakage. The flow rate characteristics of the lubricator are also improved by the available extent to which the damper can flex. Stated otherwise, the lubricating oil can always be supplied at a rate substantially proportional to the rate of air flow past the damper.

Although a certain preferred embodiment has been shown and described, it should be understood that many changes and modifications may be made therein without departing from the scope of the appended claims.

What is claimed is:

1. A lubricator comprising:
   a case for storing lubricating oil;
   a main body coupled to said case and defining an air passage therethrough having an inlet end and an outlet end, said main body including a first hole;
   a damper disposed in said air passage and flexibly displaceable dependent on the rate of air flow through said air passage for varying the effective cross-sectional area of said air passage, said damper comprising a plate-like damper body positioned in said air passage and a support including a second hole and being mounted in said first hole of the main body, communication between said air passage and said case being provided through said first and second holes, said support supporting said damper body, said damper body and said support being integrally molded of a flexible material, said damper body having a groove horizontally transversely defined in a surface thereof which is downstream in the direction of the air flow through said air passage in the vicinity of a base portion close to said support; and
   a plate-like damper holder which supports said damper in said main body, said damper holder having a fixed restriction communication between said second hole and the interior of said case.

2. A lubricator according to claim 1, wherein said groove has a curved cross-sectional shape.

3. A lubricator according to claim 1, wherein said damper body has a shell shape complimentary to the cross-sectional shape of said air passage.

* * * * *